United States Patent
Fu (10) Patent No.: US 11,061,925 B2
(45) Date of Patent: Jul. 13, 2021

(54) MULTI-TASK SCHEDULING METHOD AND SYSTEM, APPLICATION SERVER AND COMPUTER-READABLE STORAGE MEDIUM

(71) Applicant: Ping An Technology (Shenzhen) Co., Ltd., Guangdong (CN)

(72) Inventor: Jun Fu, Guangdong (CN)

(73) Assignee: PING AN TECHNOLOGY (SHENZHEN) CO., LTD., Shenzhen (CN)

(*) Notice: Subject to any disclaimer, the term of this patent is extended or adjusted under 35 U.S.C. 154(b) by 560 days.

(21) Appl. No.: 16/084,980

(22) PCT Filed: Aug. 31, 2017

(86) PCT No.: PCT/CN2017/100052
§ 371 (c)(1),
(2) Date: Sep. 14, 2018

(87) PCT Pub. No.: WO2019/000630
PCT Pub. Date: Jan. 3, 2019

(65) Prior Publication Data
US 2021/0124757 A1 Apr. 29, 2021

(30) Foreign Application Priority Data
Jun. 25, 2017 (CN) .......................... 201710490454.5

(51) Int. Cl.
*G06F 16/27* (2019.01)
*G06F 16/21* (2019.01)
*G06F 9/48* (2006.01)

(52) U.S. Cl.
CPC ............ *G06F 16/27* (2019.01); *G06F 9/4881* (2013.01); *G06F 16/214* (2019.01)

(58) Field of Classification Search
CPC ....... G06F 16/27; G06F 16/214; G06F 9/4881
(Continued)

(56) References Cited

U.S. PATENT DOCUMENTS 7,865,574 B1 * 1/2011 Laura ..................... G06Q 10/06
709/219
9,183,004 B2 * 11/2015 Manjunath .............. G06F 9/451
(Continued)

FOREIGN PATENT DOCUMENTS

CN 106528070 A 3/2017
WO 9952047 A1 10/1999

OTHER PUBLICATIONS

Search Report of counterpart European Patent Application No. 17904352.6 dated Nov. 29, 2019.

*Primary Examiner* — Hanh B Thai (57) ABSTRACT

A multi-task scheduling method and system, an application server and a computer-readable storage medium are provided. The method includes: establishing a first connection between a data platform and at least one data source, and establishing a second connection between the data platform and the application server; receiving source tables selected by a user to be synchronized and data source types, generating a table creation task and data synchronization task corresponding to each data source, and distributing them to a preset workflow scheduling engine; when synchronization starting time selected by the user is reached, calling a preset task scheduling interface template through the preset workflow scheduling engine, and transmitting synchronization parameters to the task scheduling interface template; and calling a corresponding task execution script in the task scheduling interface template according to the synchronization parameters, and executing the table creation task and data synchronization task corresponding to each data source.

15 Claims, 4 Drawing Sheets

(58) Field of Classification Search
USPC .......................................................... 707/618
See application file for complete search history.

(56) References Cited

U.S. PATENT DOCUMENTS

| | | | |
|---|---|---|---|
| 2011/0131554 A1* | 6/2011 | Doi ....................... | G06F 8/4441 |
| | | | 717/131 |
| 2012/0226788 A1* | 9/2012 | Jackson ................ | G06F 15/161 |
| | | | 709/223 |
| 2015/0019478 A1 | 1/2015 | Buehne et al. | |
| 2015/0117629 A1* | 4/2015 | Ristock ............... | H04M 3/5232 |
| | | | 379/265.03 |
| 2017/0098180 A1* | 4/2017 | Chandraghatgi ........................... | |
| | | | G06Q 10/06311 |
| 2018/0232242 A1* | 8/2018 | Onu .......................... | G06F 9/54 |

* cited by examiner

MULTI-TASK SCHEDULING METHOD AND SYSTEM, APPLICATION SERVER AND COMPUTER-READABLE STORAGE MEDIUM

This application claims priority to China Patent Application No. 201710490454.5, filed on Jun. 25, 2017 and entitled "Multi-Task Scheduling Method, Application Server and Computer-Readable Storage Medium", which is hereby incorporated by reference in its entirety.

TECHNICAL FIELD

This disclosure relates to the technical field of computer information, and particularly relates to a multi-task scheduling method, an application server and a computer-readable storage medium.

BACKGROUND

In existing task scheduling interface (for example, oozie web service Application Programming Interface (API)) design, it is necessary to sequentially deploy different specified files (for example, an execution script and a scheduling script) into a Hadoop Distributed File System (HDFS). Such a design manner definitely requires a deployment flow and is not so convenient. Therefore, task scheduling interface design in the prior art is not reasonable enough and needs to be improved.

SUMMARY

In view of this, the disclosure discloses a multi-task scheduling method and system, an application server and a computer-readable storage medium. Parameterization for API calling is implemented, and during data synchronization, a synchronization task may be completed only by transmitting a synchronization parameter without a deployment flow.

At first, to achieve the purpose, the disclosure discloses an application server, which includes a memory and a processor, wherein a multi-task scheduling system capable of running on the processor is stored on the memory, and when the multi-task scheduling system is executed by the processor, the following steps are implemented:

establishing a first connection between a data platform and at least one data source, and establishing a second connection between the data platform and the application server;

receiving source tables selected by a user to be synchronized and data source types, generating a table creation task and data synchronization task corresponding to each data source according to a source table structure, obtained by pre-parsing, of each data source, and distributing the generated table creation task and data synchronization task corresponding to each data source to a preset workflow scheduling engine;

when synchronization starting time selected by the user is reached, calling a preset task scheduling interface template from a specified file system through the preset workflow scheduling engine, and transmitting a synchronization parameter of the data synchronization task corresponding to each data source to the task scheduling interface template through the preset workflow scheduling engine; and calling a corresponding task execution script in the task scheduling interface template according to the synchronization parameter of the data synchronization task corresponding to each data source, and executing the table creation task and data synchronization task corresponding to each data source.

In addition, to achieve the purpose, the disclosure also provides a multi-task scheduling method, which is applied to an application server and includes:

establishing a first connection between a data platform and at least one data source, and establishing a second connection between the data platform and the application server;

receiving source tables selected by a user to be synchronized and data source types, generating a table creation task and data synchronization task corresponding to each data source according to a source table structure, obtained by pre-parsing, of each data source, and distributing the generated table creation task and data synchronization task corresponding to each data source to a preset workflow scheduling engine;

when synchronization starting time selected by the user is reached, calling a preset task scheduling interface template from a specified file system through the preset workflow scheduling engine, and transmitting a synchronization parameter of the data synchronization task corresponding to each data source to the task scheduling interface template through the preset workflow scheduling engine; and calling a corresponding task execution script in the task scheduling interface template according to the synchronization parameter of the data synchronization task corresponding to each data source, and executing the table creation task and data synchronization task corresponding to each data source.

Preferably, the task scheduling interface template includes a parameter configuration script, task execution scripts and a task scheduling script, the parameter configuration script is configured to receive the synchronization parameters transmitted by the workflow scheduling engine, the task execution scripts are configured to execute the task creation task and data synchronization task corresponding to each data source according to the synchronization parameter of the data synchronization task corresponding to each data source, and the task scheduling script is configured to manage an execution sequence of the data synchronization task corresponding to each data source.

Further, to achieve the purpose, the disclosure also provides a computer-readable storage medium, which stores a multi-task scheduling system, wherein the multi-task scheduling system may be executed by at least one processor to implement the following steps:

establishing a first connection between a data platform and at least one data source, and establishing a second connection between the data platform and an application server;

receiving source tables selected by a user to be synchronized and data source types, generating a table creation task and data synchronization task corresponding to each data source according to a source table structure, obtained by pre-parsing, of each data source, and distributing the generated table creation task and data synchronization task corresponding to each data source to a preset workflow scheduling engine;

when synchronization starting time selected by the user is reached, calling a preset task scheduling interface template from a specified file system through the preset workflow scheduling engine, and transmitting a synchronization parameter of the data synchronization task corresponding to each data source to the task scheduling interface template through the preset workflow scheduling engine; and calling a corresponding task execution script in the task scheduling interface template according to the synchronization parameter of the data synchronization task corresponding to each data source, and executing the table creation task and data synchronization task corresponding to each data source.

Furthermore, to achieve the purpose, the disclosure also provides a multi-task scheduling system, which includes:

a connection module, configured to establish a first connection between a data platform and at least one data source and establish a second connection between the data platform and an application server;

a task distribution module, configured to receive source tables selected by a user to be synchronized and data source types, generate a table creation task and data synchronization task corresponding to each data source according to a source table structure, obtained by pre-parsing, of each data source and distribute the generated table creation task and data synchronization task corresponding to each data source to a preset workflow scheduling engine;

a scheduling module, configured to, when synchronization starting time selected by the user is reached, call a preset task scheduling interface template from a specified file system through the preset workflow scheduling engine and transmit a synchronization parameter of the data synchronization task corresponding to each data source to the task scheduling interface template through the preset workflow scheduling engine; and an execution module, configured to call a corresponding task execution script in the task scheduling interface template according to the synchronization parameter of the data synchronization task corresponding to each data source and execute the table creation task and data synchronization task corresponding to each data source.

Compared with the prior art, the application server, multi-task scheduling method and system and computer-readable storage medium disclosed by the disclosure have the following advantages: the table creation task and data synchronization task corresponding to each data source are automatically generated according to the source tables selected by the user to be synchronized and the data source types; meanwhile, different specified files (for example, the parameter configuration script, the task execution scripts and the task scheduling script) are deployed in the task scheduling interface template at one time, and when data synchronization operation is executed, the task scheduling interface template is directly called, the synchronization parameter of the data synchronization task corresponding to each data source is transmitted to the task scheduling interface template, and the table creation task and data synchronization task corresponding to each data source are automatically executed; and therefore, the whole data synchronization process of multiple data sources is automatically implemented without a deployment flow, parameterization for API calling is implemented, and during data synchronization, the synchronization tasks may be completed only by transmitting the synchronization parameters.

Reference signs in the accompanying drawings:

| | |
|---|---|
| Application server | 2 |
| Network | 3 |
| Data platform | 4 |
| Data source | 5 |
| Memory | 21 |
| Processor | 22 |
| Network interface | 23 |
| Multi-task scheduling system | 20 |
| Connection module | 201 |
| Task distribution module | 202 |
| Scheduling module | 203 |
| Execution module | 204 |
| Flow steps | S41-S44 |

Achievement of the purpose, functional characteristics and advantages of the disclosure will be further described with reference to the accompanying drawings.

DETAILED DESCRIPTION OF ILLUSTRATED EMBODIMENTS

For making the purpose, technical solutions and advantages of the disclosure clearer, the disclosure will be further described below in combination with the accompanying drawings and embodiments in detail. It should be understood that the specific embodiments described herein are adopted not to limit the disclosure but only to explain the disclosure. All other embodiments obtained by those of ordinary skilled in the art on the basis of the embodiments in the disclosure without creative work shall fall within the scope of protection of the disclosure.

It is important to note that descriptions involving "first", "second" and the like in the disclosure are only intended for description and should not be understood to indicate or imply relative importance or implicitly indicate the number of indicated technical characteristics. Therefore, the characteristic defined with "first" and "second" may explicitly or implicitly indicate inclusion of at least one such characteristic. In addition, the technical solutions of each embodiment may be combined as long as such combinations may be implemented by those of ordinary skilled in the art, and when a combination of the technical solutions has a conflict or may not be implemented, this combination of the technical solutions should be considered to not exist and be out of the claimed scope of protection of the disclosure.

It is important to further note that terms "include" and "contain" or any other variation thereof in the disclosure is intended to cover nonexclusive inclusions, so that a process, method, object or device including a series of elements may not only include those elements but also include other elements which are not explicitly listed or further include elements intrinsic to the process, the method, the object or the device. Under the circumstance of no more limits, an element defined by a statement "including a/an . . . " does not exclude existence of the same other element in a process, method, object or device including the element.

Figure 1:
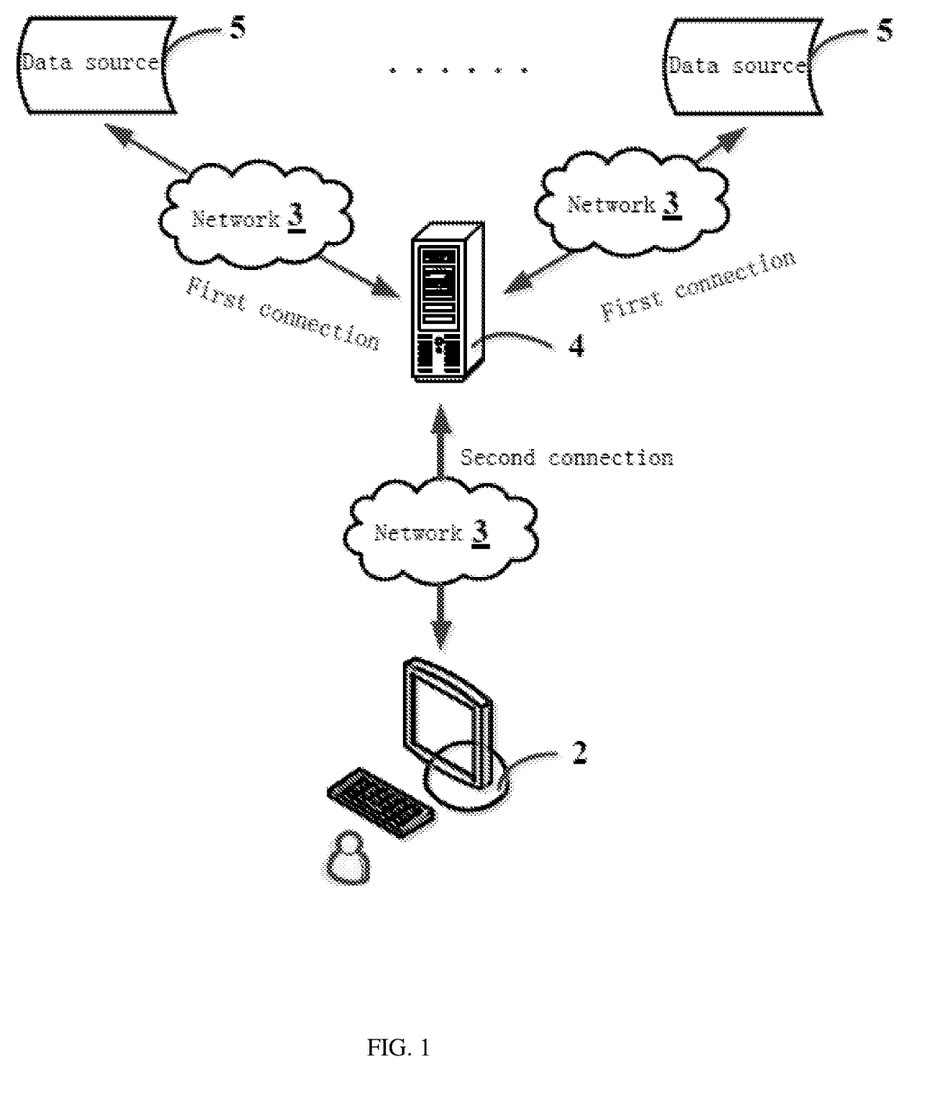
FIG. 1 is a schematic diagram of an optional application environment according to each embodiment of the disclosure.

Referring to FIG. 1, a schematic diagram of an optional application environment according to each embodiment of the disclosure is shown.

In the embodiment, the disclosure may be applied to an application environment including, but not limited to, an application server 2, networks 3, a data platform 4 and data sources 5, wherein the application server 2 may be computing equipment such as a rack server, a blade server, a tower server or a cabinet server, and the application server 2 may be an independent server and may also be a server cluster formed by multiple servers; and the networks 3 may be wireless or wired networks such as an intranet of an enterprise, the Internet, a Global System of Mobile communication (GSM), Wideband Code Division Multiple Access (WCDMA), a 4th-Generation (4G) network, a 5th-Generation (5G) network, Bluetooth and Wireless Fidelity (Wi-Fi).

Wherein, the application server 2 forms a communication connection with the data platform 4 through the network 3, and the data platform 4 forms a communication connection with each data source 5 through the network 3. A first connection (or called a first-type connection) is established between the data platform 4 and each data source 5, so that the data platform 4 may perform data transmission and interaction with each data source 5 through the first connection. A second connection (or called a second-type connection) is established between the data platform 4 and the application server 2, so that the data platform 4 may perform data transmission and interaction with the application server 2 through the second connection.

Figure 2:
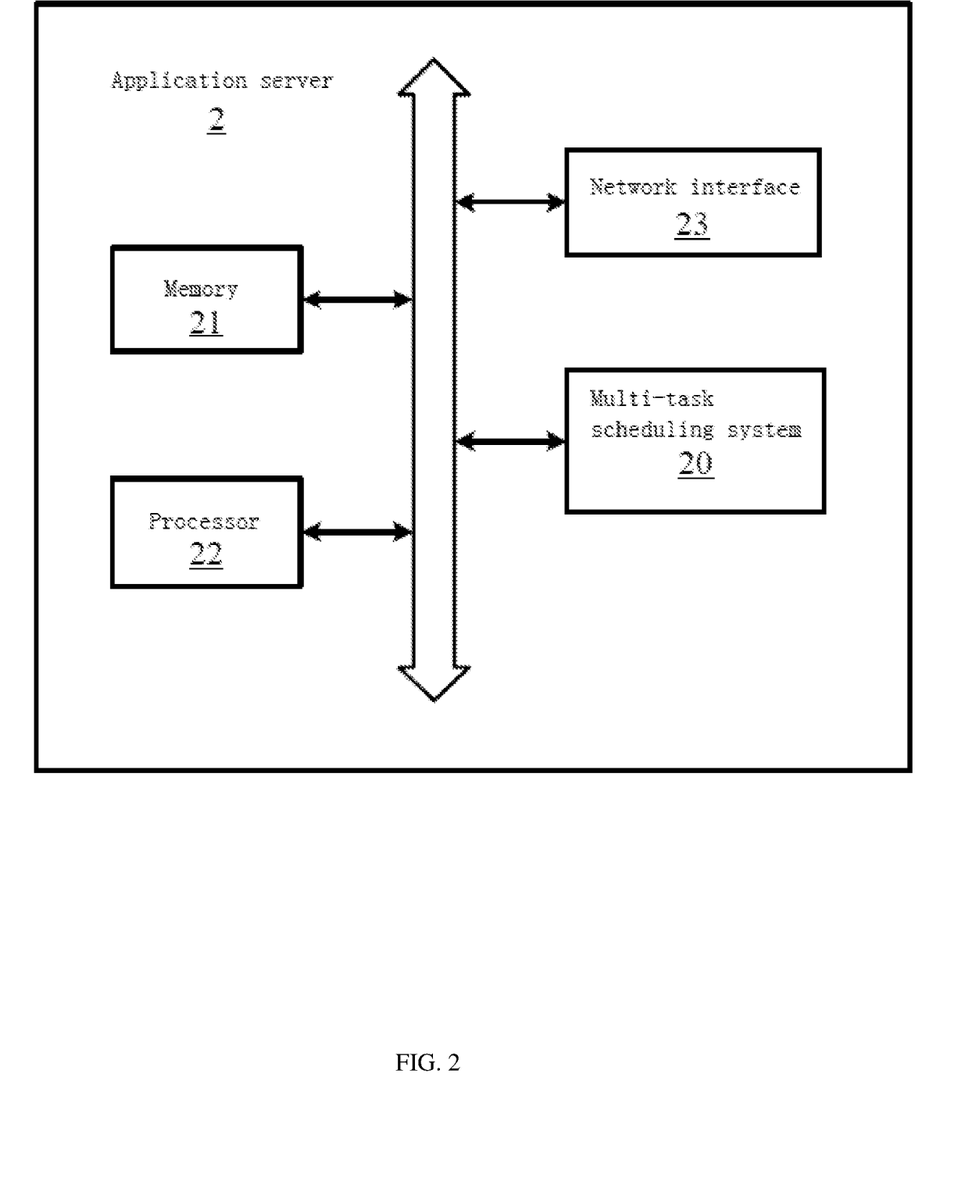
FIG. 2 is a schematic diagram of an optional hardware architecture of the application server in FIG. 1.

Referring to FIG. 2, a schematic diagram of an optional hardware architecture of the application server 2 in FIG. 1 is shown. In the embodiment, the application server 2 may include, but not limited to, a memory 21, processor 22 and network interface 23 which may form communication connections with one another through a system bus. It is important to point out that the application server 2 with the components 21-23 is only shown in FIG. 2. However, it should be understood that not all of the shown components are required to be implemented and more or fewer components may be implemented instead.

Wherein, the memory 21 includes at least one type of readable storage medium, and the readable storage medium includes a flash memory, a hard disk, a multimedia card, a card type memory (for example, a Secure Digital (SD) or DX memory), a Random Access Memory (RAM), a Static RAM (SRAM), a Read-Only Memory (ROM), an Electrically Erasable Programmable ROM (EEPROM), a Programmable ROM (PROM), a magnetic memory, a magnetic disk, an optical disk and the like. In some embodiments, the memory 21 may be an internal storage unit of the application server 2, for example, a hard disk or memory of the application server 2. In some other embodiments, the memory 21 may also be external storage equipment of the application server 2, for example, a plug-in type hard disk, Smart Media Card (SMC), Secure Digital (SD) card and flash card configured on the application server 2. Of course, the memory 21 may not only include the internal storage unit of the application server 2 but also include the external storage equipment. In the embodiment, the memory 21 is usually configured to store an operating system and various types of application software installed in the application server 2, for example, a program code of a multi-task scheduling system 20. In addition, the memory 21 may further be configured to temporally store various types of data which has been output or will be output.

The processor 12, in some embodiments, may be a Central Processing Unit (CPU), a controller, a microcontroller, a microprocessor or another data processing chip. The processor 22 is usually configured to control overall operation of the application server 2, for example, executing control and processing related to data interaction or communication with the application server 2. In the embodiment, the processor 22 is configured to run the program code stored in the memory 21 or process data, for example, running the multi-task scheduling system 20.

The network interface 23 may include a wireless network interface or a wired network interface, and the network interface 23 is usually configured to establish a communication connection between the application server 2 and other electronic equipment. In the embodiment, the network interface 23 is mainly configured to connect the application server 2 with the data platform 4 through the network 3 and establish a data transmission channel and a communication connection between the application server 2 and the data platform 4.

So far, the application environment of each embodiment of the disclosure, and a hardware structure and function of related equipment have been introduced in detail. Each embodiment of the disclosure will be disclosed below on the basis of the application environment and the related equipment.

At first, the disclosure discloses a multi-task scheduling system 20.

Figure 3:
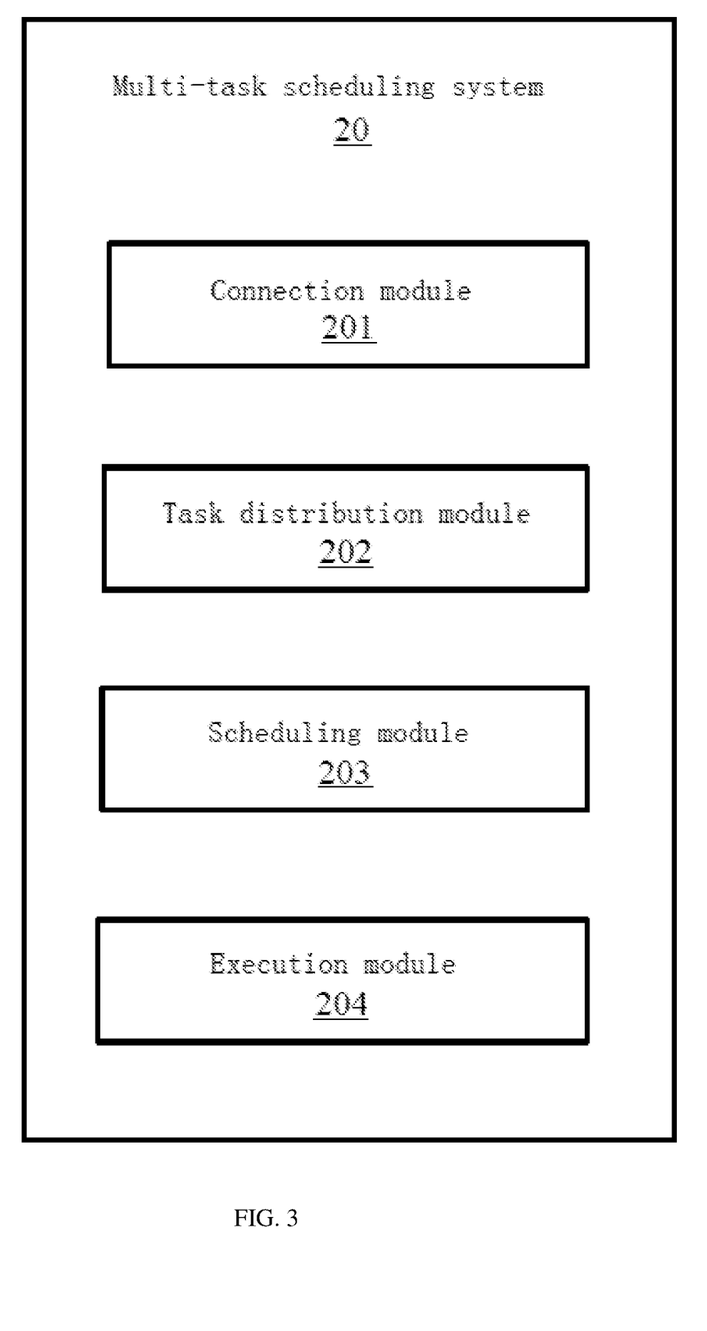
FIG. 3 is a schematic diagram of functional modules in an embodiment of a multi-task scheduling system in an application server.

Referring to FIG. 3, a diagram of functional modules in an embodiment of a multi-task scheduling system 20 in an application server 2 is shown. In the embodiment, the multi-task scheduling system 20 may be divided into one or more modules, and the one or more modules are stored in a memory 21 and are executed by one or more processors (a processor 22 in the embodiment) to implement the disclosure. For example, in FIG. 3, the multi-task scheduling system 20 may be divided into a connection module 201, a task distribution module 202, a scheduling module 203 and an execution module 204. Functional module mentioned in the disclosure refers to a series of computer program instruction segments capable of realizing specific functions and is more suitable than a program to describe an execution process of the multi-task scheduling system 20 in the application server 2. Functions of each of the functional modules 201-204 will be described below in detail.

The connection module 201 is configured to establish a first connection (or called a first-type connection) between a data platform 4 and at least one data source 5 and establish a second connection (or called a second-type connection) between the data platform 4 and an application server 2 (for example, a parsing server).

Preferably, in the embodiment, the data platform 4 adopts a Hadoop data platform, and the first connection between the data platform 4 and each data source 5 is established through a data transmission tool in the data platform 4. For example, the data transmission tool is a Sqoop tool set in Hadoop. Those skilled in the art should know that the data platform and the data transmission tool may also adopt other types in other embodiments.

The task distribution module 202 is configured to receive source tables (part or all) selected by a user to be synchronized and data source types, generate a table creation task and data synchronization task (or called a data extraction task) corresponding to each data source according to a source table structure, obtained by pre-parsing, of each data source and distribute the generated table creation task and data synchronization task corresponding to each data source to a preset workflow scheduling engine (for example, an oozie scheduling engine).

Preferably, in the embodiment, the data source types include, but not limited to, a first-type data source (for example, a Microsoft Structured Query Language (MS SQL) server data source), a second-type data source (for example, an Oracle data source), a third-type data source (for example, a MySQL data source) and the like. Those skilled in the art should know that the number of the data source types may also be increased or decreased according to requirements of different data platforms in the other embodiments. For example, the user may select to synchronize part of source tables in first-type data sources.

Preferably, in the embodiment, the source table structure of the data source includes, but not limited to, a data type, included field information and the like of each data source.

Preferably, in the embodiment, a parsing script file corresponding to each data source 5 is set in the application server 2, and the data transmission tool in the data platform 4 is controlled through a parallel scheduling mechanism to execute a source table structure parsing task in each parsing script file in parallel to obtain the source table structure of each data source by parsing and return the source table structure, obtained by parsing, of each data source to the application server 2 through the second connection.

Preferably, in the embodiment, the operation that the table creation task corresponding to each data source is generated includes that: target tables corresponding to types of the selected source tables are generated according to the source tables (part or all) selected by the user to be synchronized and the type of each source table. Preferably, in the embodiment, the types of the source tables include, but not limited to, a first-type dimension table (i.e., a source table with a small data volume and associatively configured for use), a second-type task table (i.e., a table in which data is kept updated and added and historical data except data of the present day may be updated on the present day) and a third-type day-to-day table (i.e., a table in which data is kept added and historical data except data of the present day may not be updated on the present day).

Specifically, if the types of the source tables selected by the user to be synchronized are first-type dimension tables (i.e., source tables with small data volumes and associatively configured for use), first-type target tables corresponding to source table structures of the first-type dimension tables are generated, wherein the number of the first-type target tables is determined according to the number of the first-type source tables selected by the user to be synchronized.

If the types of the source tables selected by the user to be synchronized are second-type task tables (i.e., tables in which data is kept updated and added and historical data except data of the present day may be updated on the present day), second-type target tables corresponding to source table structures of the second-type task tables are generated, wherein the number of the second-type target tables is determined according to the number of the second-type source tables selected by the user to be synchronized.

If the types of the source tables selected by the user to be synchronized are third-type day-to-day tables (i.e., tables in which data is kept added and historical data except data of the present day may not be updated on the present day), third-type target tables corresponding to source table structures of the third-type day-to-day tables are generated, wherein the number of the third-type target tables is determined according to the number of the third-type source tables selected by the user to be synchronized.

Preferably, in the embodiment, the operation that the data synchronization task corresponding to each data source is generated includes that:

starting time of data extraction and stopping time of data extraction from each source table are determined according to starting time and ending time, selected by the user, of required synchronization;

a resource configuration (for example, a CPU, a memory and a magnetic disk) and resource management node required by each task during data synchronization are determined according to the number of the source tables selected by the user to be synchronized and a target synchronization user, wherein the resource configuration may be implemented in a list manner, and the resource management node may be implemented by adopting a Hadoop resource representation model and a resource allocation model; and a corresponding relationship between corresponding fields of the source tables selected to be synchronized and corresponding fields of each generated target table is established, and a data extraction task corresponding to each source table is generated according to the corresponding relationship between the corresponding fields of the source tables and the target tables.

Specifically, if the types of the source tables selected by the user to be synchronized are the first-type dimension tables, a corresponding relationship between corresponding fields of the first-type dimension tables selected to be synchronized and corresponding fields of each generated first-type target table is established, and a data extraction task corresponding to each first-type dimension table is generated according to the corresponding relationship between the corresponding fields of the first-type dimension tables and the first-type target tables;

if the types of the source tables selected by the user to be synchronized are the second-type task tables, a corresponding relationship between corresponding fields of the second-type task tables selected to be synchronized and corresponding fields of each generated second-type target table is established, and a data extraction task corresponding to each second-type task table is generated according to the corresponding relationship between the corresponding fields of the second-type task tables and the second-type target tables; and if the types of the source tables selected by the user to be synchronized are the third-type day-to-day tables, a corresponding relationship between corresponding fields of the third-type day-to-day tables selected to be synchronized and corresponding fields of each generated third-type target table is established, and a data extraction task corresponding to each third-type day-to-day table is generated according to the corresponding relationship between the corresponding fields of the third-type day-to-day tables and the third-type target tables.

The scheduling module 203 is configured to, when synchronization starting time selected by the user is reached, call a preset task scheduling interface template from a specified file system through the preset workflow scheduling engine and transmit a synchronization parameter of the data synchronization task corresponding to each data source to the task scheduling interface template through the preset workflow scheduling engine. In the implementation mode, the specified file system is a distributed file system, for example, an HDFS, and the task scheduling interface template is an oozie web service API template, wherein the task scheduling interface template is pre-deployed in the specified file system.

Preferably, in the embodiment, the synchronization parameter includes, but not limited to, information about the resource configuration and resource management node required by each task, the starting time and ending time of data synchronization, a username selecting the synchronization parameter and the like.

Preferably, in the embodiment, the task scheduling interface template includes, but not limited to, a parameter configuration script, task execution scripts and a task scheduling script, wherein the parameter configuration script is a shell script, and is configured to receive the synchronization parameters transmitted by the workflow scheduling engine; the task execution scripts are Extensible Markup Language (XML) scripts, and are configured to execute the task creation task and data synchronization task corresponding to each data source according to the synchronization parameter of the data synchronization task corresponding to each data source; and the task scheduling script is an XML script, and is configured to manage an execution sequence of the data synchronization task corresponding to each data source.

Preferably, in the embodiment, the task execution scripts include, but not limited to, a first execution script configured to extract data from the first-type dimension tables, a second execution script configured to extract data from the second-type task tables and a third execution script configured to extract data from the third-type day-to-day tables.

The execution module 204 is configured to call a corresponding task execution script in the task scheduling interface template according to the synchronization parameter of the data synchronization task corresponding to each data source and execute the table creation task and data synchronization task corresponding to each data source.

Preferably, in the embodiment, the execution of the data synchronization task includes that:

the task execution script corresponding to each data source in the task scheduling interface template is called, the resource configuration required by each task during data synchronization is acquired, data (metadata information) corresponding to the corresponding field is extracted from each source table and the extracted data is stored into the corresponding field of each target table.

Specifically, if the types of the source tables selected by the user to be synchronized are the first-type dimension tables, the first execution script in the task scheduling interface template is called, first data corresponding to the corresponding field is extracted from each first-type dimension table, and the extracted first data is stored into the corresponding field of each first-type target table;

if the types of the source tables selected by the user to be synchronized are the second-type task tables, the second execution script in the task scheduling interface template is called, second data corresponding to the corresponding field is extracted from each second-type task table, and the extracted second data is stored into the corresponding field of each second-type target table; and if the types of the source tables selected by the user to be synchronized are the third-type day-to-day tables, the third execution script in the task scheduling interface template is called, third data corresponding to the corresponding field is extracted from each third-type day-to-day table, and the extracted third data is stored into the corresponding field of each third-type target table.

Preferably, in other embodiments, when the multi-task scheduling system 20 is executed by the processor 22, the following step is further implemented:

the corresponding task execution script in the task scheduling interface template is called through the parallel scheduling mechanism to execute the table creation task and data synchronization task corresponding to each data source in parallel, extract the data corresponding to the corresponding field from each source table and store the extracted data into the corresponding field of each target table.

According to the multi-task scheduling system 20 disclosed in the disclosure, through the functional modules 201-204, the table creation task and data synchronization task corresponding to each data source are automatically generated according to the source tables selected by the user to be synchronized and the data source types; meanwhile, different specified files (for example, the parameter configuration script, the task execution scripts and the task scheduling script) are deployed in the task scheduling interface template at one time, and when data synchronization operation is executed, the task scheduling interface template is directly called, the synchronization parameter of the data synchronization task corresponding to each data source is transmitted to the task scheduling interface template, and the table creation task and data synchronization task corresponding to each data source are automatically executed; and therefore, the whole data synchronization process of multiple data sources is automatically implemented without a deployment flow, parameterization for API calling is implemented, and during data synchronization, the synchronization tasks may be completed only by transmitting the synchronization parameters.

In addition, the disclosure further discloses a multi-task scheduling method.

Figure 4:
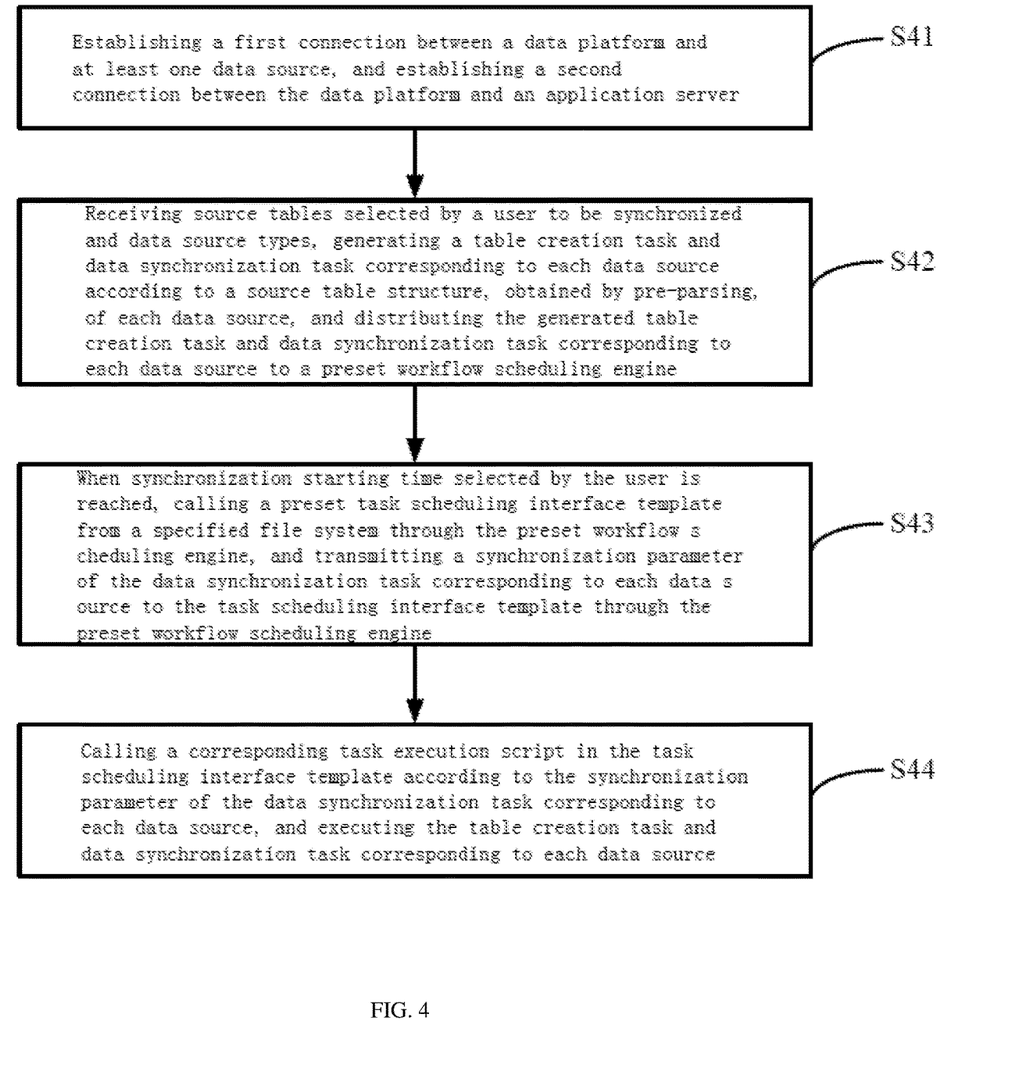
FIG. 4 is an implementation flowchart of an embodiment of a multi-task scheduling method according to the disclosure.

Referring to FIG. 4, an implementation flowchart of an embodiment of a multi-task scheduling method according to the disclosure is shown. In the embodiment, according to different requirements, an execution sequence of steps in the flowchart shown in FIG. 4 may be changed and some steps may be eliminated.

In Step S41, a first connection (or called a first-type connection) is established between a data platform 4 and at least one data source 5, and a second connection (or called a second-type connection) is established between the data platform 4 and an application server 2 (for example, a parsing server).

Preferably, in the embodiment, the data platform 4 adopts a Hadoop data platform, and the first connection between the data platform 4 and each data source 5 is established through a data transmission tool in the data platform 4. For example, the data transmission tool is a Sqoop tool set in Hadoop. Those skilled in the art should know that other types of the data platform and the data transmission tool may also be adopted in other embodiments.

In Step S42, source tables (part or all) selected by a user to be synchronized and data source types are received, a table creation task and data synchronization task (or called a data extraction task) corresponding to each data source are generated according to a source table structure, obtained by pre-parsing, of each data source, and the generated table creation task and data synchronization task corresponding to each data source are distributed to a preset workflow scheduling engine (for example, an oozie scheduling engine).

Preferably, in the embodiment, the data source types include, but not limited to, a first-type data source (for example, an MS SQL server data source), a second-type data source (for example, an Oracle data source), a third-type data source (for example, a MySQL data source) and the like. Those skilled in the art should know that the number of the data source types may also be increased or decreased according to requirements of different data platforms in the other embodiments. For example, the user may select to synchronize part of source tables in first-type data sources.

Preferably, in the embodiment, the source table structure of the data source includes, but not limited to, a data type, included field information and the like of each data source.

Preferably, in the embodiment, a parsing script file corresponding to each data source 5 is set in the application server 2, and the data transmission tool in the data platform 4 is controlled through a parallel scheduling mechanism to execute a source table structure parsing task in each parsing script file in parallel to obtain the source table structure of each data source by parsing and return the source table structure, obtained by parsing, of each data source to the application server 2 through the second connection.

Preferably, in the embodiment, the operation that the table creation task corresponding to each data source is generated includes that: target tables corresponding to types of the selected source tables are generated according to the source tables (part or all) selected by the user to be synchronized and the type of each source table. Preferably, in the embodiment, the types of the source tables include, but not limited to, a first-type dimension table (i.e., a source table with a small data volume and associatively configured for use), a second-type task table (i.e., a table in which data is kept updated and added and historical data except data of the present day may be updated on the present day) and a third-type day-to-day table (i.e., a table in which data is kept added and historical data except data of the present day may not be updated on the present day).

Specifically, if the types of the source tables selected by the user to be synchronized are first-type dimension tables (i.e., source tables with small data volumes and associatively configured for use), first-type target tables corresponding to source table structures of the first-type dimension tables are generated, wherein the number of the first-type target tables is determined according to the number of the first-type source tables selected by the user to be synchronized.

If the types of the source tables selected by the user to be synchronized are second-type task tables (i.e., tables in which data is kept updated and added and historical data except data of the present day may be updated on the present day), second-type target tables corresponding to source table structures of the second-type task tables are generated, wherein the number of the second-type target tables is determined according to the number of the second-type source tables selected by the user to be synchronized.

If the types of the source tables selected by the user to be synchronized are third-type day-to-day tables (i.e., tables in which data is kept added and historical data except data of the present day may not be updated on the present day), third-type target tables corresponding to source table structures of the third-type day-to-day tables are generated, wherein the number of the third-type target tables is determined according to the number of the third-type source tables selected by the user to be synchronized.

Preferably, in the embodiment, the operation that the data synchronization task corresponding to each data source is generated includes that:

starting time of data extraction and stopping time of data extraction from each source table are determined according to starting time and ending time, selected by the user, of required synchronization;

a resource configuration (for example, a CPU, a memory and a magnetic disk) and resource management node required by each task during data synchronization are determined according to the number of the source tables selected by the user to be synchronized and a target synchronization user, wherein the resource configuration may be implemented in a list manner, and the resource management node may be implemented by adopting a Hadoop resource representation model and a resource allocation model; and a corresponding relationship between corresponding fields of the source tables selected to be synchronized and corresponding fields of each generated target table is established, and a data extraction task corresponding to each source table is generated according to the corresponding relationship between the corresponding fields of the source tables and the target tables.

Specifically, if the types of the source tables selected by the user to be synchronized are the first-type dimension tables, a corresponding relationship between corresponding fields of the first-type dimension tables selected to be synchronized and corresponding fields of each generated first-type target table is established, and a data extraction task corresponding to each first-type dimension table is generated according to the corresponding relationship between the corresponding fields of the first-type dimension tables and the first-type target tables;

if the types of the source tables selected by the user to be synchronized are the second-type task tables, a corresponding relationship between corresponding fields of the second-type task tables selected to be synchronized and corresponding fields of each generated second-type target table is established, and a data extraction task corresponding to each second-type task table is generated according to the corresponding relationship between the corresponding fields of the second-type task tables and the second-type target tables; and if the types of the source tables selected by the user to be synchronized are the third-type day-to-day tables, a corresponding relationship between corresponding fields of the third-type day-to-day tables selected to be synchronized and corresponding fields of each generated third-type target table is established, and a data extraction task corresponding to each third-type day-to-day table is generated according to the corresponding relationship between the corresponding fields of the third-type day-to-day tables and the third-type target tables.

In Step S43, when synchronization starting time selected by the user is reached, a preset task scheduling interface template is called from a specified file system through the preset workflow scheduling engine, and a synchronization parameter of the data synchronization task corresponding to each data source is transmitted to the task scheduling interface template through the preset workflow scheduling engine. In the implementation mode, the specified file system is a distributed file system, for example, an HDFS, and the task scheduling interface template is an oozie web service API template, wherein the task scheduling interface template is pre-deployed in the specified file system.

Preferably, in the embodiment, the synchronization parameter includes, but not limited to, information about the resource configuration and resource management node required by each task, the starting time and ending time of data synchronization, a username selecting the synchronization parameter and the like.

Preferably, in the embodiment, the task scheduling interface template includes, but not limited to, a parameter configuration script, task execution scripts and a task scheduling script, wherein the parameter configuration script is a shell script, and is configured to receive the synchronization parameters transmitted by the workflow scheduling engine; the task execution scripts are XML scripts, and are configured to execute the task creation task and data synchronization task corresponding to each data source according to the synchronization parameter of the data synchronization task corresponding to each data source; and the task scheduling script is an XML script, and is configured to manage an execution sequence of the data synchronization task corresponding to each data source.

Preferably, in the embodiment, the task execution scripts include, but not limited to, a first execution script configured to extract data from the first-type dimension tables, a second execution script configured to extract data from the second-type task tables and a third execution script configured to extract data from the third-type day-to-day tables.

In Step S44, a corresponding task execution script in the task scheduling interface template is called according to the synchronization parameter of the data synchronization task corresponding to each data source, the table creation task and data synchronization task corresponding to each data source are executed.

Preferably, in the embodiment, the execution of the data synchronization task includes that:

the task execution script corresponding to each data source in the task scheduling interface template is called, the resource configuration required by each task during data synchronization is acquired, data (metadata information) corresponding to the corresponding field is extracted from each source table and the extracted data is stored into the corresponding field of each target table.

Specifically, if the types of the source tables selected by the user to be synchronized are the first-type dimension tables, the first execution script in the task scheduling interface template is called, first data corresponding to the corresponding field is extracted from each first-type dimension table, and the extracted first data is stored into the corresponding field of each first-type target table;

if the types of the source tables selected by the user to be synchronized are the second-type task tables, the second execution script in the task scheduling interface template is called, second data corresponding to the corresponding field is extracted from each second-type task table, and the extracted second data is stored into the corresponding field of each second-type target table; and if the types of the source tables selected by the user to be synchronized are the third-type day-to-day tables, the third execution script in the task scheduling interface template is called, third data corresponding to the corresponding field is extracted from each third-type day-to-day table, and the extracted third data is stored into the corresponding field of each third-type target table.

Preferably, in other embodiments, the method further includes the following step:

the corresponding task execution script in the task scheduling interface template is called through the parallel scheduling mechanism to execute the table creation task and data synchronization task corresponding to each data source in parallel, extract the data corresponding to the corresponding field from each source table and store the extracted data into the corresponding field of each target table.

According to the multi-task scheduling method disclosed in the disclosure, by the Steps S41-S44, the table creation task and data synchronization task corresponding to each data source are automatically generated according to the source tables selected by the user to be synchronized and the data source types; meanwhile, different specified files (for example, the parameter configuration script, the task execution scripts and the task scheduling script) are deployed in the task scheduling interface template at one time, and when data synchronization operation is executed, the task scheduling interface template is directly called, the synchronization parameter of the data synchronization task corresponding to each data source is transmitted to the task scheduling interface template, and the table creation task and data synchronization task corresponding to each data source are automatically executed; and therefore, the whole data synchronization process of multiple data sources is automatically implemented without a deployment flow, parameterization for API calling is implemented, and during data synchronization, the synchronization tasks may be completed only by transmitting the synchronization parameters.

Furthermore, to achieve the purpose, the disclosure also provides a computer-readable storage medium (for example, a ROM/RAM, a magnetic disk and an optical disk), which stores a multi-task scheduling system 20, wherein the multi-task scheduling system 20 may be executed by at least one processor 22 to enable the at least one processor 22 to execute the steps of the abovementioned multi-task scheduling method.

By the description of the foregoing implementation modes, it will be evident to those skilled in the art that the method according to the above embodiments can be implemented by means of software plus the necessary general-purpose hardware platform; and they can of course be implemented by hardware, but in many cases the former will be a preferred implementation mode. Based on such an understanding, the essential technical solution of the disclosure, or the portion that contributes to the prior art may be embodied as software products. Computer software products can be stored in a storage medium (e.g., a ROM/RAM, a magnetic disk and an optical disc) and may include multiple instructions that, when executed, can cause a piece of terminal equipment (e.g., a mobile phone, a computer, a server or network equipment) to execute the method described in the various embodiments of the disclosure.

The foregoing description merely depicts the preferred embodiments of the disclosure with reference to the accompanying drawings and is not thus intended to limit the patentable scope of the disclosure. Sequence numbers of the embodiments of the disclosure are adopted not to represent quality of the embodiments but only for description. In addition, although a logic sequence is shown in the flowchart, the shown or described steps may be executed in a sequence different from that shown herein under some circumstances.

Those skilled in the art may implement the disclosure with multiple transformed solutions without departing from the scope and essence of the disclosure. For example, a characteristic taken as an embodiment may be adopted for another embodiment to obtain a third embodiment. Any equivalent structure or equivalent flow transformations made by virtue of the contents of the specification and accompanying drawings of the disclosure or direct or indirect application thereof to the other related technical fields shall also fall within the patent protection scope of the disclosure.

What is claimed is:

1. An application server, comprising a memory and a processor, wherein a multi-task scheduling system capable of running on the processor is stored on the memory, and when the multi-task scheduling system is executed by the processor, the following steps are implemented:

establishing a first connection between a data platform and at least one data source, and establishing a second connection between the data platform and the application server;

receiving source tables selected by a user to be synchronized and data source types, generating a table creation task and data synchronization task corresponding to each data source according to a source table structure, obtained by pre-parsing, of each data source, and distributing the generated table creation task and data synchronization task corresponding to each data source to a preset workflow scheduling engine;

when synchronization starting time selected by the user is reached, calling a preset task scheduling interface template from a specified file system through the preset workflow scheduling engine, and transmitting a synchronization parameter of the data synchronization task corresponding to each data source to the task scheduling interface template through the preset workflow scheduling engine; and calling a corresponding task execution script in the task scheduling interface template according to the synchronization parameter of the data synchronization task corresponding to each data source, and executing the table creation task and data synchronization task corresponding to each data source.

2. The application server of claim 1, wherein the task scheduling interface template comprises a parameter configuration script, task execution scripts and a task scheduling script, the parameter configuration script is configured to receive the synchronization parameters transmitted by the workflow scheduling engine, the task execution scripts are configured to execute the task creation task and data synchronization task corresponding to each data source according to the synchronization parameter of the data synchronization task corresponding to each data source, and the task scheduling script is configured to manage an execution sequence of the data synchronization task corresponding to each data source.

3. The application server of claim 2, wherein the task execution scripts comprise a first execution script configured to extract data from first-type dimension tables, a second execution script configured to extract data from second-type task tables and a third execution script configured to extract data from third-type day-to-day tables.

4. The application server of claim 2, wherein the execution of the data synchronization task comprises:

calling the task execution script corresponding to each data source in the task scheduling interface template, acquiring a resource configuration required by each task during data synchronization, extracting data corresponding to a corresponding field from each source table and storing the extracted data into a corresponding field of each target table.

5. The application server of claim 4, wherein the execution of the data synchronization task comprises:

if types of the source tables selected by the user to be synchronized are the first-type dimension tables, calling the first execution script in the task scheduling interface template, extracting first data corresponding to a corresponding field from each first-type dimension table, and storing the extracted first data into a corresponding field of each first-type target table;

if the types of the source tables selected by the user to be synchronized are the second-type task tables, calling the second execution script in the task scheduling interface template, extracting second data corresponding to a corresponding field from each second-type task table, and storing the extracted second data into a corresponding field of each second-type target table; and if the types of the source tables selected by the user to be synchronized are the third-type day-to-day tables, calling the third execution script in the task scheduling interface template, extracting third data corresponding to a corresponding field from each third-type day-to-day table, and storing the extracted third data into a corresponding field of each third-type target table.

6. A multi-task scheduling method, applied to an application server, comprising:

establishing a first connection between a data platform and at least one data source, and establishing a second connection between the data platform and the application server;

receiving source tables selected by a user to be synchronized and data source types, generating a table creation task and data synchronization task corresponding to each data source according to a source table structure, obtained by pre-parsing, of each data source, and distributing the generated table creation task and data synchronization task corresponding to each data source to a preset workflow scheduling engine;

when synchronization starting time selected by the user is reached, calling a preset task scheduling interface template from a specified file system through the preset workflow scheduling engine, and transmitting a synchronization parameter of the data synchronization task corresponding to each data source to the task scheduling interface template through the preset workflow scheduling engine; and calling a corresponding task execution script in the task scheduling interface template according to the synchronization parameter of the data synchronization task corresponding to each data source, and executing the table creation task and data synchronization task corresponding to each data source.

7. The multi-task scheduling method of claim 6, wherein the task scheduling interface template comprises a parameter configuration script, task execution scripts and a task scheduling script, the parameter configuration script is configured to receive the synchronization parameters transmitted by the workflow scheduling engine, the task execution scripts are configured to execute the task creation task and data synchronization task corresponding to each data source according to the synchronization parameter of the data synchronization task corresponding to each data source, and the task scheduling script is configured to manage an execution sequence of the data synchronization task corresponding to each data source.

8. The multi-task scheduling method of claim 7, wherein the task execution scripts comprise a first execution script configured to extract data from first-type dimension tables, a second execution script configured to extract data from second-type task tables and a third execution script configured to extract data from third-type day-to-day tables.

9. The multi-task scheduling method of claim 8, wherein the execution of the data synchronization task comprises:

calling the task execution script corresponding to each data source in the task scheduling interface template, acquiring a resource configuration required by each task during data synchronization, extracting data corresponding to a corresponding field from each source table and storing the extracted data into a corresponding field of each target table.

10. The multi-task scheduling method of claim 9, wherein the execution of the data synchronization task comprises:

if types of the source tables selected by the user to be synchronized are the first-type dimension tables, calling the first execution script in the task scheduling interface template, extracting first data corresponding to a corresponding field from each first-type dimension table, and storing the extracted first data into a corresponding field of each first-type target table;

if the types of the source tables selected by the user to be synchronized are the second-type task tables, calling the second execution script in the task scheduling interface template, extracting second data corresponding to a corresponding field from each second-type task table, and storing the extracted second data into a corresponding field of each second-type target table; and if the types of the source tables selected by the user to be synchronized are the third-type day-to-day tables, calling the third execution script in the task scheduling interface template, extracting third data corresponding to a corresponding field from each third-type day-to-day table, and storing the extracted third data into a corresponding field of each third-type target table.

11. A computer-readable storage medium, storing a multi-task scheduling system, wherein the multi-task scheduling system may be executed by at least one processor to implement the following steps:

establishing a first connection between a data platform and at least one data source, and establishing a second connection between the data platform and an application server;

receiving source tables selected by a user to be synchronized and data source types, generating a table creation task and data synchronization task corresponding to each data source according to a source table structure, obtained by pre-parsing, of each data source, and distributing the generated table creation task and data synchronization task corresponding to each data source to a preset workflow scheduling engine;

when synchronization starting time selected by the user is reached, calling a preset task scheduling interface template from a specified file system through the preset workflow scheduling engine, and transmitting a synchronization parameter of the data synchronization task corresponding to each data source to the task scheduling interface template through the preset workflow scheduling engine; and calling a corresponding task execution script in the task scheduling interface template according to the synchronization parameter of the data synchronization task corresponding to each data source, and executing the table creation task and data synchronization task corresponding to each data source.

12. The computer-readable storage medium of claim 11, wherein the task scheduling interface template comprises a parameter configuration script, task execution scripts and a task scheduling script, the parameter configuration script is configured to receive the synchronization parameters transmitted by the workflow scheduling engine, the task execution scripts are configured to execute the task creation task and data synchronization task corresponding to each data source according to the synchronization parameter of the data synchronization task corresponding to each data source, and the task scheduling script is configured to manage an execution sequence of the data synchronization task corresponding to each data source.

13. The computer-readable storage medium of claim 12, wherein the task execution scripts comprise a first execution script configured to extract data from first-type dimension tables, a second execution script configured to extract data from second-type task tables and a third execution script configured to extract data from third-type day-to-day tables.

14. The computer-readable storage medium of claim 13, wherein execution of the data synchronization task comprises:

calling the task execution script corresponding to each data source in the task scheduling interface template, acquiring a resource configuration required by each task during data synchronization, extracting data corresponding to a corresponding field from each source table and storing the extracted data into a corresponding field of each target table.

15. The computer-readable storage medium of claim 14, wherein the execution of the data synchronization task comprises:

if types of the source tables selected by the user to be synchronized are the first-type dimension tables, calling the first execution script in the task scheduling interface template, extracting first data corresponding to a corresponding field from each first-type dimension table, and storing the extracted first data into a corresponding field of each first-type target table;

if the types of the source tables selected by the user to be synchronized are the second-type task tables, calling the second execution script in the task scheduling interface template, extracting second data corresponding to a corresponding field from each second-type task table, and storing the extracted second data into a corresponding field of each second-type target table; and if the types of the source tables selected by the user to be synchronized are the third-type day-to-day tables, calling the third execution script in the task scheduling interface template, extracting third data corresponding to a corresponding field from each third-type day-to-day table, and storing the extracted third data into a corresponding field of each third-type target table.

* * * * *